United States Patent
Xia et al.

(10) Patent No.: US 11,876,588 B2
(45) Date of Patent: *Jan. 16, 2024

(54) BEAM MANAGEMENT TECHNIQUES FOR BEAM CALIBRATION

(71) Applicant: Futurewei Technologies, Inc., Plano, TX (US)

(72) Inventors: Pengfei Xia, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,573

(22) Filed: May 16, 2022

(65) Prior Publication Data

US 2022/0352940 A1    Nov. 3, 2022

Related U.S. Application Data

(60) Continuation of application No. 16/894,038, filed on Jun. 5, 2020, now Pat. No. 11,336,347, which is a
(Continued)

(51) Int. Cl.
*H04W 72/04* (2023.01)
*H04B 7/06* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC .... H04B 7/0617; H04B 17/12; H04B 17/318; H04W 16/28; H04W 72/046; H04L 5/0048
See application file for complete search history.

(56) References Cited

U.S. PATENT DOCUMENTS

| | | | |
|---|---|---|---|
| 8,340,597 | B1 | 12/2012 | Nabar et al. |
| 2010/0150013 | A1 | 6/2010 | Hara et al. |

(Continued)

FOREIGN PATENT DOCUMENTS

| | | | |
|---|---|---|---|
| CN | 1525755 | A | 9/2004 |
| CN | 1700801 | A | 11/2005 |

(Continued)

OTHER PUBLICATIONS

NTT Docomo, Inc. "Beam correspondence information (BCI) acquisition scheme", 3GPP TSG-RAN WG1 Meeting #87, R1-1612732, Nov. 14-18, 2016, 3 Pages, Reno, USA.

*Primary Examiner* — Dady Chery
(74) *Attorney, Agent, or Firm* — Slater Matsil, LLP

(57) ABSTRACT

Embodiments of this disclosure provide techniques for determining a device's beam correspondence status. As used herein, a device is considered to have "beam correspondence" when the device's TX and RX antennas satisfy a calibration criteria. In one example, a device's TX and RX antennas satisfy the calibration criteria when a difference between quality parameters corresponding to reference signals transmitted and received using corresponding TX and RX beams is less than a threshold. In another example, a device's TX and RX antennas satisfy the calibration criteria when a list of indices ranking the device's TX beams matches a list of indices ranking the device's RX beams. The lists of indices may be derived by transmitting and receiving references signals according to the devices RX and TX beams, and then generating list of indices based on quality parameters of the respective RX and TX beams.

22 Claims, 7 Drawing Sheets

Related U.S. Application Data division of application No. 15/839,382, filed on Dec. 12, 2017, now Pat. No. 10,680,689.

(60) Provisional application No. 62/442,785, filed on Jan. 5, 2017.

(51) Int. Cl.
*H04L 5/00* (2006.01)
*H04W 72/044* (2023.01)
*H04W 16/28* (2009.01)
*H04B 7/08* (2006.01)
*H04B 17/318* (2015.01)
*H04B 17/12* (2015.01)

(52) U.S. Cl.
CPC ........... *H04L 5/0048* (2013.01); *H04W 16/28* (2013.01); *H04W 72/046* (2013.01); *H04B 17/12* (2015.01); *H04B 17/318* (2015.01)

(56) References Cited

U.S. PATENT DOCUMENTS

| | | |
|---|---|---|
| 2014/0010178 A1 | 1/2014 | Yu et al. |
| 2014/0269554 A1 | 9/2014 | Shapira et al. |
| 2017/0104517 A1 | 4/2017 | Kakishima et al. |
| 2018/0076857 A1 | 3/2018 | Jung et al. |
| 2018/0109303 A1* | 4/2018 | Yoo .................... H04W 72/085 |

FOREIGN PATENT DOCUMENTS

| | | |
|---|---|---|
| CN | 100382457 C | 4/2008 |
| CN | 101682432 A | 3/2010 |
| CN | 105873109 A | 8/2016 |
| JP | 2001053663 A | 2/2001 |

\* cited by examiner

BEAM MANAGEMENT TECHNIQUES FOR BEAM CALIBRATION

This application is a continuation of U.S. patent application Ser. No. 16/894,038 filed on Jun. 5, 2020, now U.S. Pat. No. 11,336,347 issued on May 17, 2022, and entitled "Beam Management Techniques for Beam Calibration," which is a divisional of U.S. patent application Ser. No. 15/839,382 filed on Dec. 12, 2017, now U.S. Pat. No. 10,680,689 issued on Jun. 9, 2020, and entitled "Beam Management Techniques for Beam Calibration," which claims priority to U.S. Provisional Application 62/442,785 filed on Jan. 5, 2017 and entitled "Beam Management Techniques for Beam Calibration," which is incorporated by reference herein as if reproduced in its entirety.

TECHNICAL FIELD

The present disclosure relates generally to telecommunications, and in particular embodiments, to beam management techniques for beam calibration.

BACKGROUND

Wireless signals communicated at high carrier frequencies, such as millimeter Wave (mmW) signals, tend to exhibit high free-space path loss. To compensate for high path loss rates, high-frequency communications may use beamforming at both the base station and user equipment (UE). Notably, due to spatial reciprocity, a beam direction used by a device to transmit a signal will generally offer similar levels of spatial performance when used by the device to receive a signal. As used herein, the term "beam direction" refers to a radio antenna pattern, or set of beamforming weights, that is used for directional signal transmission and/or reception. Accordingly, a UE and a base station may use the same beam directions to transmit/receive uplink and downlink signals.

SUMMARY

Technical advantages are generally achieved, by embodiments of this disclosure which describe beam management techniques for beam calibration.

In accordance with an embodiment, a method for beam calibration and/or correspondence is provided. In this embodiment, the method includes transmitting a first reference signal over a transmit (TX) radio frequency (RF) chain of a first wireless device according to a beam direction, receiving a first quality parameter corresponding to the first reference signal from a second wireless device, and receiving a second reference signal over an receive (RX) RF chain of the first wireless device according to the beam direction used to transmit the first reference signal over the TX RF chain. The method further includes determining that a difference between the first quality parameter corresponding to the first reference signal and a second quality parameter corresponding to the second reference signal exceeds a threshold and, based thereon, calibrating analog beamforming components of at least one of the TX RF chain and the RX RF chain. In one example, the analog beamforming components include analog phase adjustment components positioned on antenna paths between a digital to analog converter of the TX RF chain or an analog to digital converter of the RX RF chain and antenna elements on a TX antenna or RX antenna associated with the TX RF chain or RX RF chain. In the same example, or another example, calibrating the analog beamforming components of at least one of the TX RF chain and the RX RF chain includes adjusting analog phase shifting levels and/or delays applied by the analog phase adjustment components. In any one of the preceding examples, or another example, the first quality parameter includes a reference signal received power (RSRP) level of the first reference signal, a reference signal received quality (RSRQ) level of the first reference signal, a reference signal strength indicator (RSSI) level of the first reference signal, a signal to noise (SNR) level of the first reference signal, or a combination thereof. In any one of the preceding examples, or another example, the first wireless device is a user equipment (UE), a base station, or a relay station. An apparatus for performing this method is also provided.

In accordance with another embodiment, a method for beam calibration is provided. In this embodiment, the method includes transmitting a first set of reference signals over a transmit (TX) radio frequency (RF) chain of a first wireless device according to a set of beam directions. Each reference signal in the first set of reference signals is transmitted over a different beam direction in the set of beam directions. The method further includes receiving a first list of indices from a second wireless device and receiving a second set of reference signals over a receive (RX) RF chain of the first wireless device according to the set of beam directions. The first list of indices ranking beam directions in the set of beam directions based on quality parameters of corresponding reference signals in the first set of reference signals received by a second wireless device, and each reference signal in the second set of reference signals is received over a different beam direction in the set of beam directions. The method further includes determining a second list of indices based on the second set of reference signals. The second list of indices ranking beam directions in the set of beam directions based on quality parameters of corresponding reference signals in the second set of reference signals received over the RX RF chain. The method further includes determining that the first list of indices ranks the set of beam directions in a different order than the second list of indices and, based thereon, calibrating analog beamforming components of at least one of the TX RF chain and the RX RF chain. In one example, the analog beamforming components include analog phase adjustment components positioned on antenna paths between a digital to analog converter of the TX RF chain or an analog to digital converter of the RX RF chain and antenna elements on a TX antenna or RX antenna associated with the TX RF chain or RX RF chain. In the same embodiment, or in another embodiment, a boresight of each beam direction in the set of beam directions is different than boresights of other beam directions in the set of beam directions. In any of the preceding examples, or in another example, the second list of indices ranks beam directions in the set of beam directions based on reference signal received power (RSRP) levels, reference signal received quality (RSRQ) levels, reference signal strength indicator (RSSI) levels, or signal to noise (SNR) levels of the second set of reference signals. In any of the preceding examples, or in another example, the first wireless device is a user equipment (UE), a base station, or a relay station. An apparatus for performing this method is also provided.

In accordance with yet another embodiment, a method of beam correspondence query is provided. In this embodiment, the method include receiving a query of beam correspondence status from a second device, and sending, by the first device, a response to the second device, the response including the beam correspondence status of the first device decide. In one example, the response acknowledges that a set of transmit (TX) beams of the first device is calibrated with a set of receive (RX) beams of the first device. In such an example, the set of TX beams may be calibrated with the set of RX beams when differences between quality parameters associated with TX beams in the set of TX beams and quality parameters associated with corresponding RX beams in the set of RX beams are less than a threshold. Alternatively, in such an example, the set of TX beams may be calibrated with the set of RX beams when a list of TX beam indices has the same order as a list of RX beam indices, where the list of TX beam indices ranking TX beams in the set of TX beams is based on quality parameters associated with the TX beams, and the list of RX beam indices ranking RX beams in the set of RX beams based on quality parameters associated with the RX beams. An apparatus for performing this method is also provided.

BRIEF DESCRIPTION OF THE DRAWINGS

For a more complete understanding of embodiments provided herein, and the advantages thereof, reference is now made to the following descriptions taken in conjunction with the accompanying drawings, in which.

DETAILED DESCRIPTION OF ILLUSTRATIVE EMBODIMENTS

Figure 1:
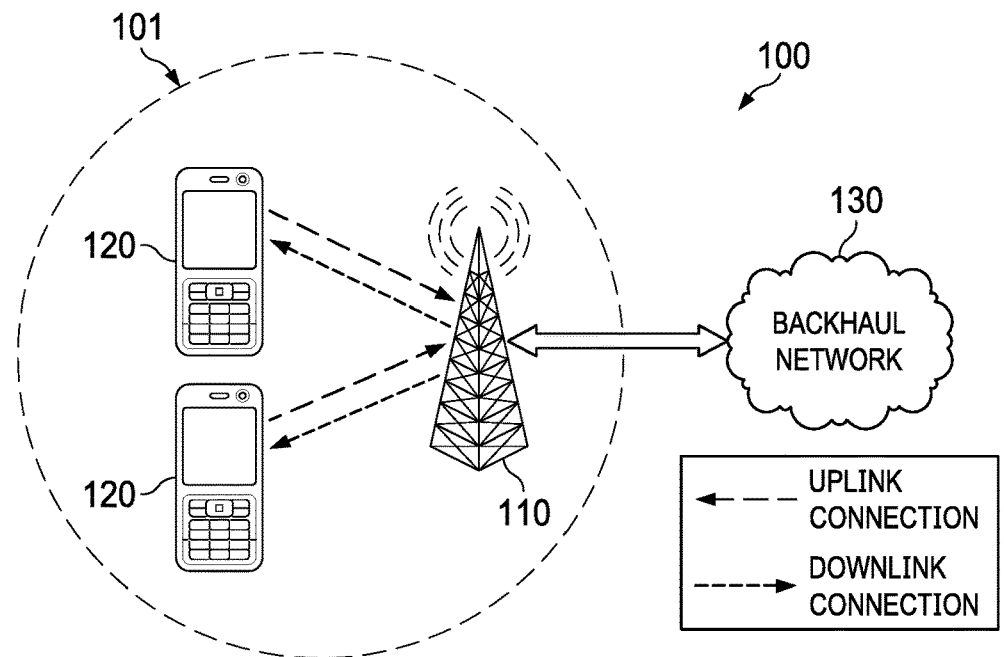
FIG. 1 is a diagram of an embodiment wireless communications network.

The structure, manufacture and use of embodiments are discussed in detail below. It should be appreciated, however, that this disclosure provides many applicable concepts that can be embodied in a wide variety of specific contexts. The specific embodiments discussed are merely illustrative of specific ways to make and use embodiments described herein, and do not limit the scope of the claims.

In fourth generation (4G) Long Term Evolution (LTE) networks, beamforming is typically performed in the digital domain. In fifth generation (5G) wireless networks, it is likely that beamforming will be performed in the analog domain as well, in order to achieve additional antenna gain from the directional transmission/reception. Beamforming is generally achieved in the analog domain by adjusting the phase of signal components on each of the antenna paths between the antenna elements and the analog to digital converter. Despite spatial reciprocity, non-ideal performance characteristics of analog beamforming components may cause the transmit (TX) and receive (RX) antenna patterns of a given beam direction to differ from one another such that, in some situations, a wireless device (e.g., a UE, a base station, a relay, etc.) may lack "beam correspondence."

Embodiments of this disclosure provide techniques for determining a device's beam correspondence status. As used herein, a device is considered to have "beam correspondence" when the device's TX and RX antennas satisfy a calibration criteria. It should be appreciated that the calibration criteria used to determine "beam correspondence" may vary depending on the performance requirements/objectives of the wireless network. In one example, a device's TX and RX antennas satisfy the calibration criteria when a difference between quality parameters corresponding to reference signals transmitted and received using corresponding TX and RX beams is less than a threshold. The term "quality parameter" refers to any parameter that is measured from a received reference signal or a function of measurement(s) taken from a received signal, including reference signal received power (RSRP) levels, reference signal received quality (RSRQ) levels, reference signal strength indicator (RSSI) levels, and/or signal to noise (SNR) levels. In the above-described example, the threshold for determining when a calibration criteria is satisfied may be any specified number, or fractional number, of units of the quality parameters of the TX and RX antennas. For instance, when the quality parameters of the TX and RX antennas are received signal power levels, the threshold may be a specified number of decibels (dBs). It should be appreciated that the value of the threshold may be predefined (e.g., a priori information to both devices) or otherwise dynamically, statically, or semi-statically defined by a network-side device according to, for example, the performance requirements and/or conditions of the wireless network, e.g., networks requiring more precise levels of beam correspondence may have smaller thresholds than networks requiring less precise levels of beam correspondence, etc.

In another example, a device's TX and RX antennas satisfy the calibration criteria when a list of indices ranking the device's TX beams matches a list of indices ranking the device's RX beams. As used herein, each index in a list of indices refers to a reference symbol (e.g., numeral, character, etc.) that is pre-associated with a beam. For example, a device may maintain a lookup table that associates each beam with a different reference symbol. The lists of indices may be derived by transmitting and receiving references signals according to the devices RX and TX beams, and then generating list of indices based on quality parameters of the respective RX and TX beams.

In some embodiments, a wireless device will report its beam correspondence status to another wireless device. For example, a UE may report its beam correspondence status to a base station upon entering the network. In other embodiments, a wireless device may calibrate its analog beam components upon determining that one or more pairs of TX/RX beams lack correspondence. In one embodiment, a wireless device performs beam calibration by transmitting a reference signal over a TX antenna using a beam direction, and receiving a reference signal over an RX antenna using the same beam direction. The reference signals may be transmitted to, and received from, another wireless device (e.g., an assistant device, a base station, etc.) that has already calibrated its beam directions, or otherwise uses an omni-directional antenna. For purposes of clarity and concision, the wireless device that performs the beam calibration is referred to as the "calibrating device" throughout this disclosure. Likewise, the reference signal that is transmitted over the TX antenna of the calibrating device is referred to as the "TX reference signal," and the reference signal that is received over the RX antenna of the calibrating device is referred to as the "RX reference signal." After transmitting the TX reference signal, the calibrating device receives feedback including a quality parameter corresponding to the TX reference signal from a wireless device that received the TX received signal. The calibrating device then compares the quality parameter corresponding to the TX reference signal with a quality parameter corresponding to the RX reference signal. If the difference between the respective quality parameters exceeds a threshold, then the calibrating device calibrates analog beamforming components of the TX antenna and/or the RX antenna. The quality parameter corresponding to the TX reference signal may be any parameter measured by the wireless device that receives the TX reference signal, and the quality parameter corresponding to the RX reference signal may be any parameter measured by the calibrating device. For example, the quality parameters may be reference signal received power (RSRP) levels, reference signal received quality (RSRQ) levels, reference signal strength indicator (RSSI) levels, or signal to noise (SNR) levels.

In another embodiment, a calibrating device performs beam calibration by transmitting a set of TX reference signals over a TX antenna according to a set of beam directions, and receiving a set of RX reference signals over an RX antenna according to the same set of beam directions. The calibrating device then receives a list of indices from a wireless device that receives the TX reference signals. The list of indices ranks the beam directions based on quality parameters corresponding to the set of TX reference signals. The calibrating device then determines its own list of indices that ranks the beam directions based on quality parameters corresponding to the set of RX reference signals, and compares the respective indices with one another to determine whether they rank the beam directions in the same order. If the respective sets of indices rank the beam directions in different orders, then the calibrating device calibrates analog beamforming components of the TX antenna and/or the RX antenna. These and other aspects are discussed in greater detail below.

FIG. 1 is a network 100 for communicating data. The network 100 comprises a base station no having a coverage area 101, a plurality of UEs 120, and a backhaul network 13o. As shown, the base station no establishes uplink (dashed line) and/or downlink (dotted line) connections with the user equipments (UEs) 120, which serve to carry data from the UEs 120 to the base station no and vice-versa. Data carried over the uplink/downlink connections may include data communicated between the UEs 120, as well as data communicated to/from a remote-end (not shown) by way of the backhaul network 13o. As used herein, the term "base station" refers to any component (or collection of components) configured to provide wireless access to a network, such as a transmit receive point (TRP), an enhanced Node B (eNB), a macro-cell, a femtocell, a Wi-Fi access point (AP), or other wirelessly enabled devices. The base station no may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network wo may comprise various other wireless devices, such as relays, low power nodes, etc.

Due to spatial reciprocity, a beam direction used by a device to transmit a signal will generally offer similar levels of spatial performance when used by the device to receive a signal. However, the non-ideal characteristics of the analog beamforming components may cause the antenna pattern of a transmit (TX) beam direction to differ from the antenna pattern of a corresponding receive (RX) beam direction. That is to say, the same set of analog beamforming weights may generate a different antenna pattern when applied to the analog TX chain than when applied to the analog RX chain. Beamforming calibration techniques are therefore needed to compensate for non-ideal characteristics of the analog beamforming components on the analog TX and RX chains.

Figure 2:
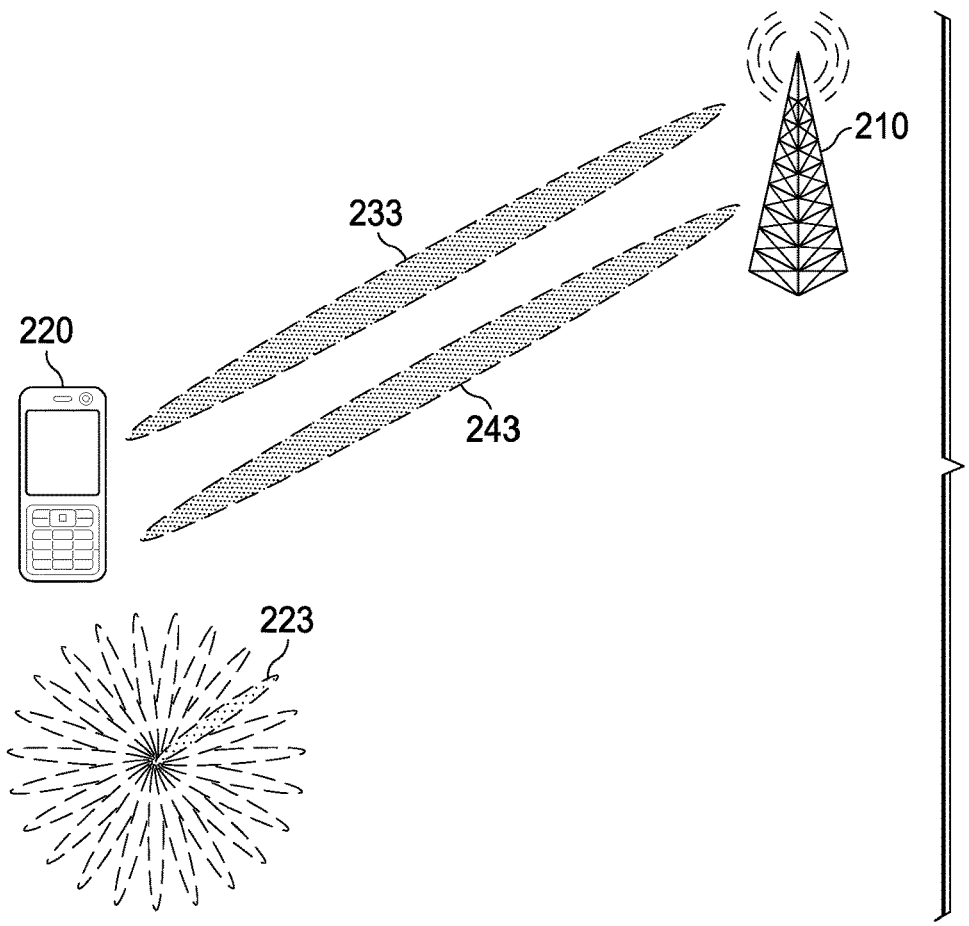
FIG. 2 is a diagram of beamformed transmissions between a UE and a base station.
Figure 3:
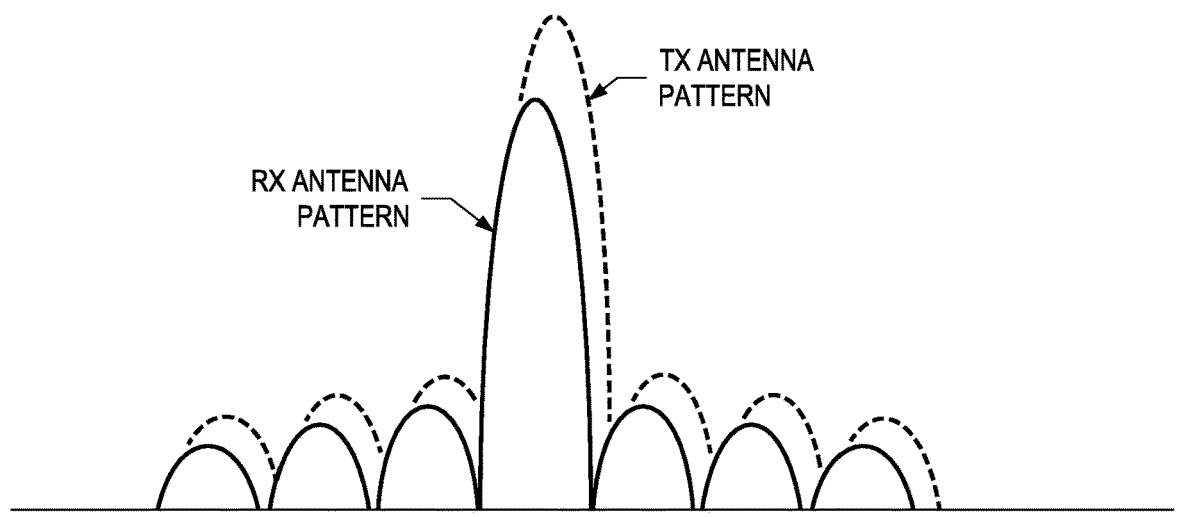
FIG. 3 is a graph of antenna diagrams for TX and RX reference signals transmitted and received according to the same beam direction.

FIG. 2 is a diagram of a beamforming technique 200. As shown, the UE 220 transmits a TX reference signal 233 to the base station 210 using the beam direction 223, and receives an RX reference signal 243 using the beam direction 223. Due to non-ideal performance characteristics of analog beamforming components in TX and RX antennas of the UE 220, the beam direction 223 may produce different TX and RX antenna patterns. FIG. 3 is a graph of TX and RX antenna patterns corresponding to the beam direction 223. In this example, the primary and secondary lobes of the TX and RX antenna have different borescopes. In other examples, the primary and secondary lobes of the TX and RX antenna may have different beamwidths. One or both of these conditions may affect antenna gain, or otherwise cause TX signals and RX signals transmitted/received according to the beam direction 223 to exhibit different quality parameters upon reception.

After receiving the TX reference signal 233, the base station 210 sends a quality parameter corresponding to the TX reference signal 233 to the UE 220. The UE compares the quality parameter corresponding to the TX reference signal 233 with a quality parameter corresponding to the RX reference signal 243. When the difference between the respective quality parameters exceeds a threshold, the UE 220 calibrates analog beamforming components on the TX and/or RX antenna.

It should be appreciated that beam calibration may be performed by transmitting and receiving reference signals over a single beam direction, or over multiple beam directions at the same time, or in the same calibration session. For example, the UE 220 may receive RX reference signals over two or more beam directions, transmit TX reference signals over those two or more beam directions, and then compare quality parameters of the respective pairs of TX and RX reference signals (e.g., TX and RX reference signals corresponding to the same beam direction) to determine whether beamforming components needs to be adjusted for any of the beam directions. In some embodiments, the base station 210 may transmit a query of beam calibration status to the UE 220. The query may request that the UE 220 acknowledges whether the calibration of one or more beam directions satisfies one or more criteria. In one example, the calibration of a given beam direction satisfies a criterion when a difference between the TX and RX reference signal quality levels is less than a threshold. The UE 220 may then send a response to the base station 210 that acknowledges whether the calibration of the one or more beam directions was successful.

Figure 4:
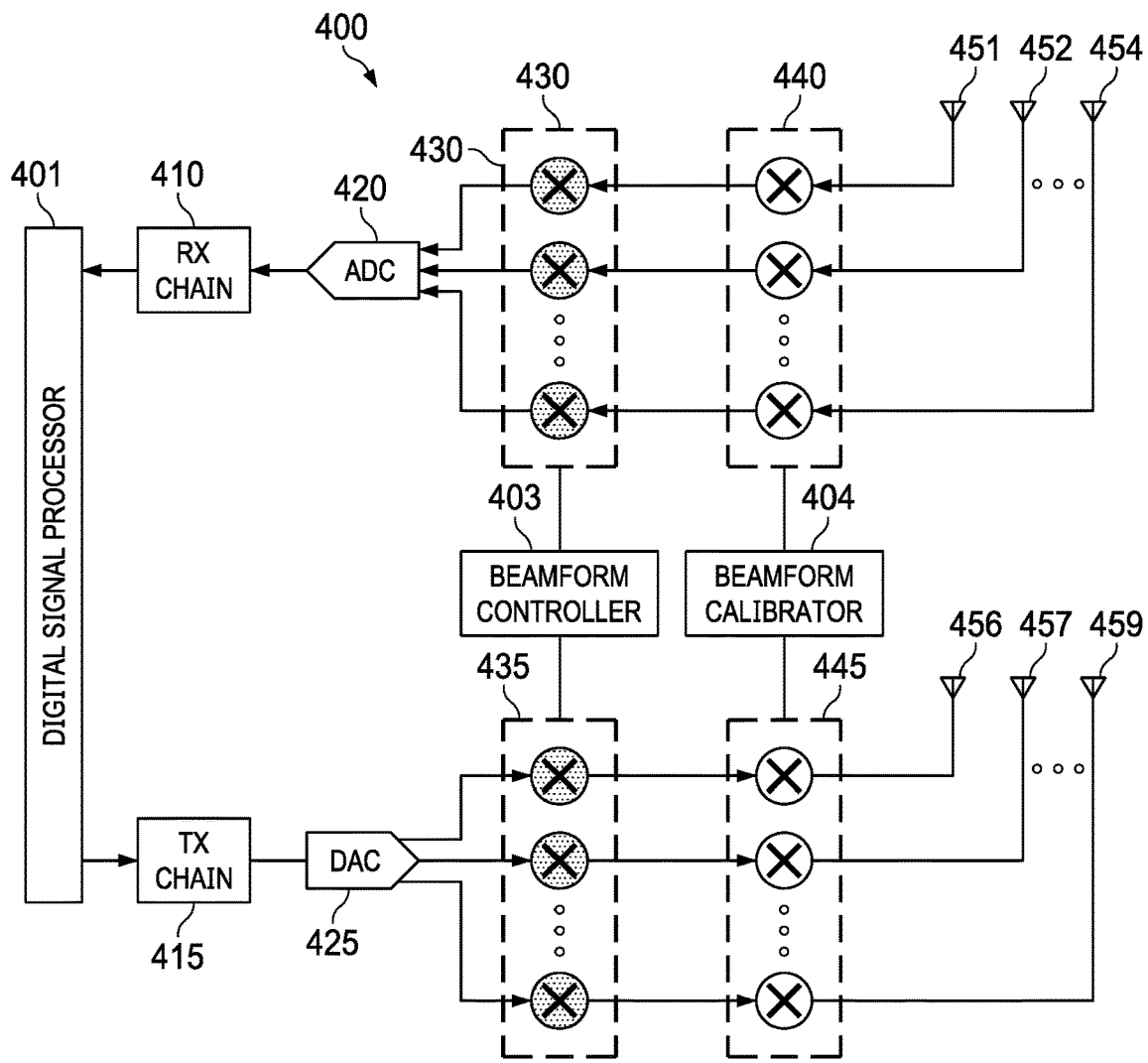
FIG. 4 is a diagram of an embodiment transceiver configured for beam calibration.

FIG. 4 is a diagram of a transceiver 400 configured for beam calibration. As shown, the transceiver 400 includes a digital signal processor 401, a beamform controller 403, and beamform calibrator 404, a digital RX chain 410, a digital TX chain 415, an analog to digital (ADC) converter 420, a digital to analog converter (DAC) 425, a set of primary RX beamforming components 430, a set of primary TX beamforming components 435, a set of secondary RX beamforming components 440, a set of secondary RX beamforming components 445, a set of RX antenna elements 451, 452, 454, and a set of TX antenna elements 456, 457, 458.

In regards to wireless reception, the RX antenna elements 451, 452, 454 collectively form an RX antenna that converts a wireless signal into an analog radio frequency (RF) signal. The primary and secondary RX beamforming components 430, 440 adjust phase components of the analog RF signal to effectuate directional reception. The analog RF signal is then converted to a digital RF signal by the ADC 420. The digital RF signal is then converted into a baseband signal by the RX chain 410, and the baseband signal is processed by the digital signal processor 401.

In regards to wireless transmission, the TX chain 415 converts a baseband signal generated by the digital signal processor 401 into a digital RF signal, which is converted into an analog RF signal by the DAC 425. The primary and secondary TX beamforming components 435, 445 adjust phase components of the analog RF signal to effectuate directional transmission prior to emission of the analog RF signal over the TX antenna elements 456, 457, 458, which collectively form a TX antenna.

The beamform controller 403 configures a beam direction for the RX antenna and the TX antenna by setting beamforming weights for the set of primary RX beamforming components 430 and the set of primary TX beamforming components 435, respectively. Due to non-ideal performance characteristics of the primary RX and TX beamforming components 430, 435, different RX and TX antenna patterns may result when the same beam direction is configured for the RX and TX antenna of the transceiver 400. The beamform calibrator 404 adjusts beamforming weights for the secondary RX and TX beamforming components 440, 445 to compensate for the non-ideal performance characteristics of the primary RX and TX beamforming components 430, 435. In this way, the secondary RX and TX beamforming components 440, 445 are used to mitigates differences in TX and RX antenna patterns corresponding to a given beam direction. In some embodiments, secondary beamforming components are used for one of the TX or RX antennas but not the other. In such embodiments, the single set of secondary beamforming components can be used to adjust the corresponding antenna pattern to mitigate difference between that antenna pattern and the other antenna pattern.

In some embodiments, the beamform calibrator 404 adjusts the beamforming weights for secondary RX/TX beamforming components 440, 445 based on a quality parameters associated with TX and RX reference signals. For example, the beamform calibrator 404 may iteratively adjust the beamforming weights for secondary RX/TX beamforming components 440, 445 until a difference between a quality parameter associated with a TX reference signal and a quality parameter associated with an RX reference signal drops below a threshold.

Figure 5:
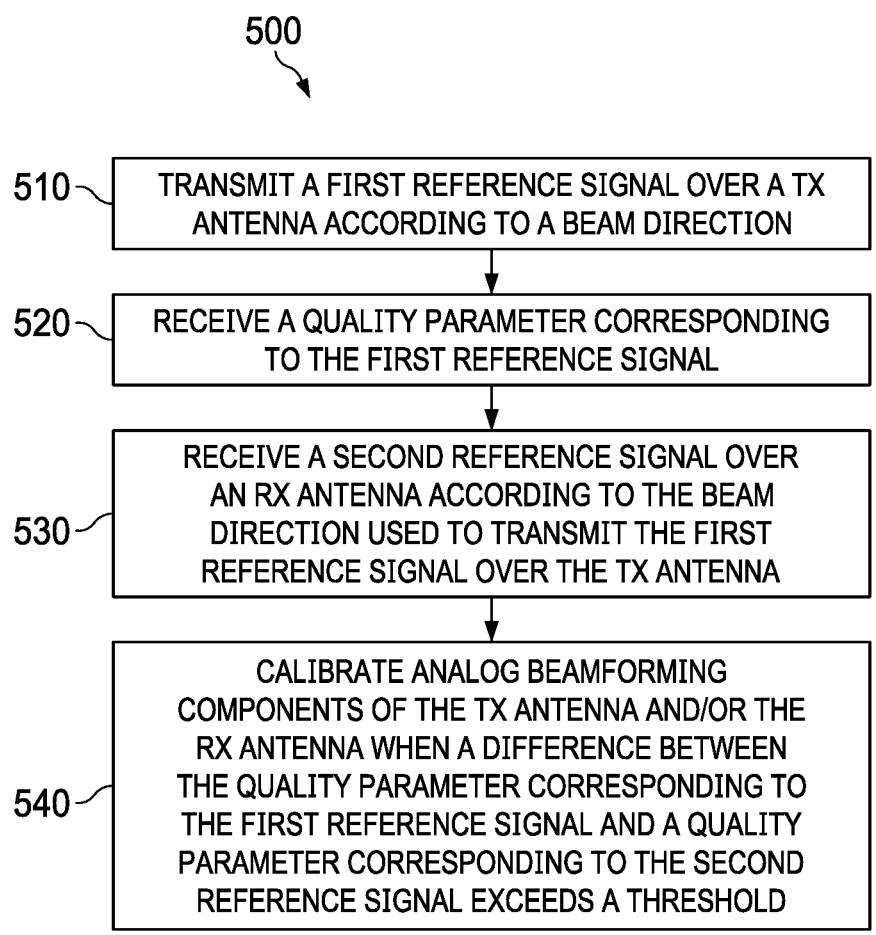
FIG. 5 is a flowchart of an embodiment method for a beam calibration.

FIG. 5 is a flowchart of an embodiment method 500 for beam calibration, as may be performed by a calibrating device. At step 510, the calibrating device transmits a first reference signal over a TX antenna according to a beam direction to another wireless device, e.g., an assistant device, a base station, etc. At step 520, the calibrating device receives a quality parameter corresponding to the first reference signal from the other wireless device. At step 530, the calibrating device receives a second reference signal over an RX antenna according to the beam direction used to transmit the first reference signal over the TX antenna from the other wireless device. It should be appreciated that steps 510-530 could be performed in any order. At step 540, the calibrating device calibrates analog beamforming components of the TX antenna and/or the RX antenna when a difference between the quality parameter corresponding to the first reference signal and a quality parameter corresponding to the second reference signal exceeds a threshold. In one embodiment, at step 540, the calibrating device determines that a difference between the first quality parameter corresponding to the first reference signal and a second quality parameter corresponding to the second reference signal exceeds a threshold and, based thereon, calibrates analog beamforming components of at least one of the TX RF chain and the RX RF chain.

Figure 6:
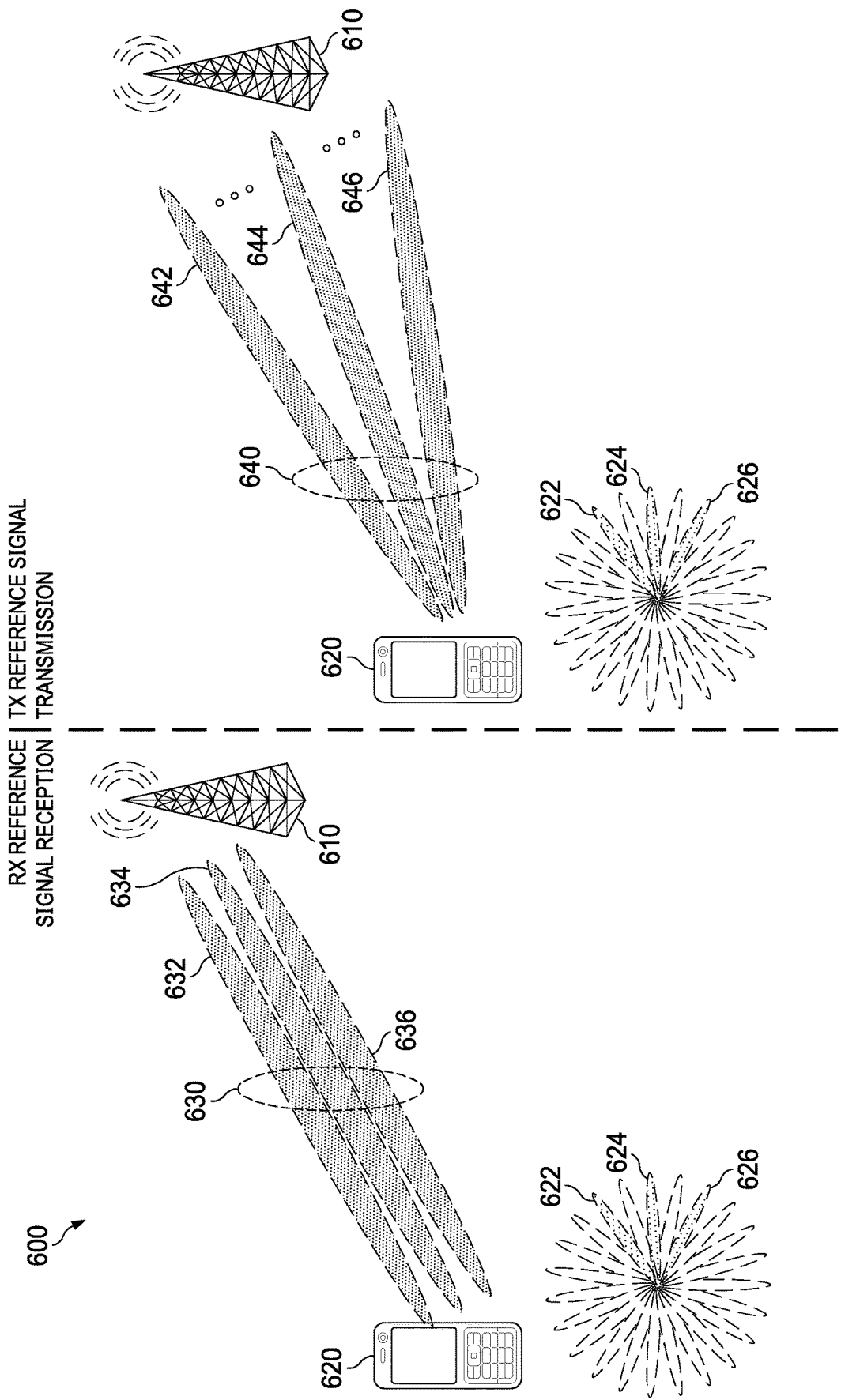
FIG. 6 is a diagram of an embodiment beam calibration technique.

Embodiments of this disclosure also provide beam calibration techniques. Before the calibration, the calibrating device and the other wireless device may exchange information of number of beams to be calibrated as well as other configurations, such as reference signals, transmit power, etc. FIG. 6 is a diagram of a course beamformed calibration technique 600 between a UE 620 and a base station 610. In particular, the UE 620 receives a set of RX reference signals 630 from the base station 610 using a set of beam directions, and then transmits a set of TX reference signals 640 to the base station 610 using a set of beam directions, and then the same set of beam directions. In this example, the set of beam directions includes three beam directions 622, 624, 626. Accordingly, the set of RX reference signals 630 includes RX reference signals 632, 634, 636 received using the beam directions 622, 624, 626 (respectively), and the set of TX reference signals 640 includes TX reference signals 642, 644, 646 transmitted using the beam directions 622, 624, 626 (respectively). In other examples, set of beam directions may include different numbers of beam directions. In some embodiments, the TX/RX reference signals are transmitted in multiple waves. For example, when the set of beam directions may include M beam directions (where M is an integer greater than one), and the TX/RX reference signal may be transmitted in waves of N reference signals (where N is an integer greater than or equal to one, and M is an integer multiple of N).

Each of TX reference signals 642, 644, 646 may carry, or otherwise be associated with, an index assigned to the corresponding beam direction 622, 624, 626. The base station 610 may receive the TX reference signals 642, 644, 646, and arrange the indices in an ordered list that ranks the beam directions 622, 624, 626 based on a quality parameter of the TX reference signals 642, 644, 646. The base station 610 may return the list of indices to the UE 620. The UE may generate its own ordered list of indices that ranks the beam directions 622, 624, 626 based on a quality parameter of the RX reference signals 632, 634, 636. The UE may then compare the respective lists of indices to see whether they rank the beam directions 622, 624, 626 differently, and if so, calibrate analog beamforming components of the TX or RX antenna.

Figure 7:
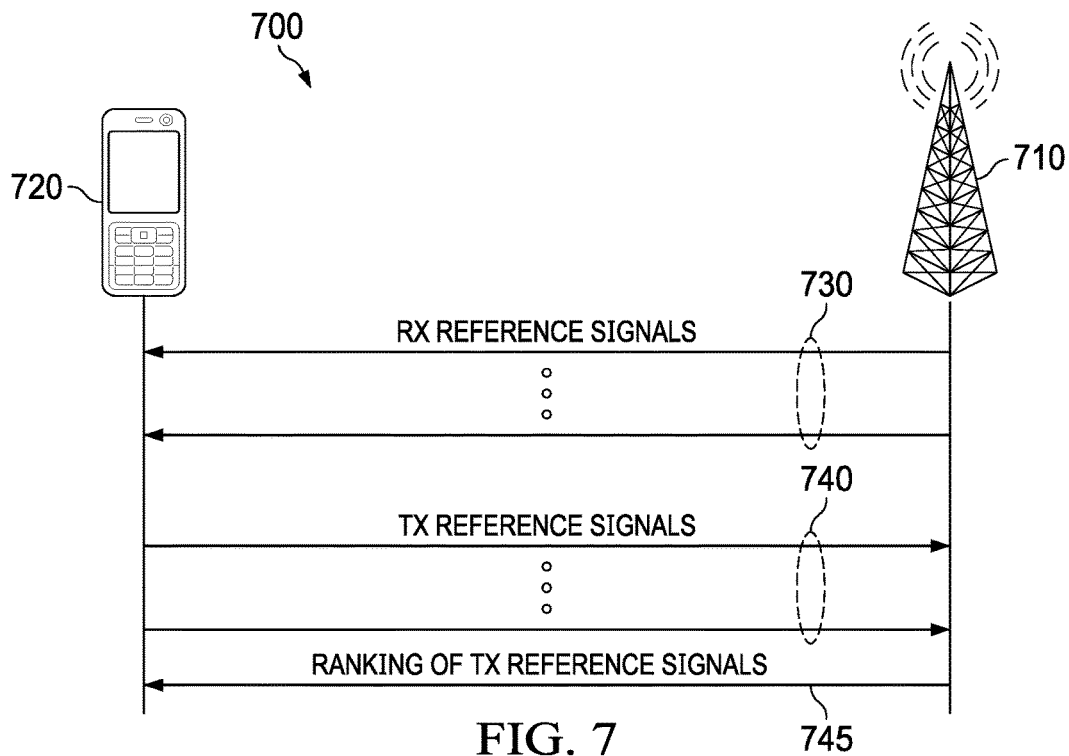
FIG. 7 is a protocol diagram of a communications sequence for beam calibration.

FIG. 7 is a protocol diagram of communications sequence 700 for beam calibration. In this example, the UE 720 receives a set of RX reference signals 730 from the base station 710 over different beam directions in a set of beam direction. The UE 720 then transmits a set of TX reference signals 740 according to the beam directions used to receive the set of RX reference signals 730. The base station 710 then returns a list of indices 745 that ranks the beam directions based on quality parameters of the set of TX reference signals 740. Thereafter, the UE generates its own list of indices that ranks the beam directions based on quality parameters of the set of RX reference signals 730, and compares the respective sets of indices to determine whether or not to calibrate beamforming components on the RX or TX antenna.

Figure 8:
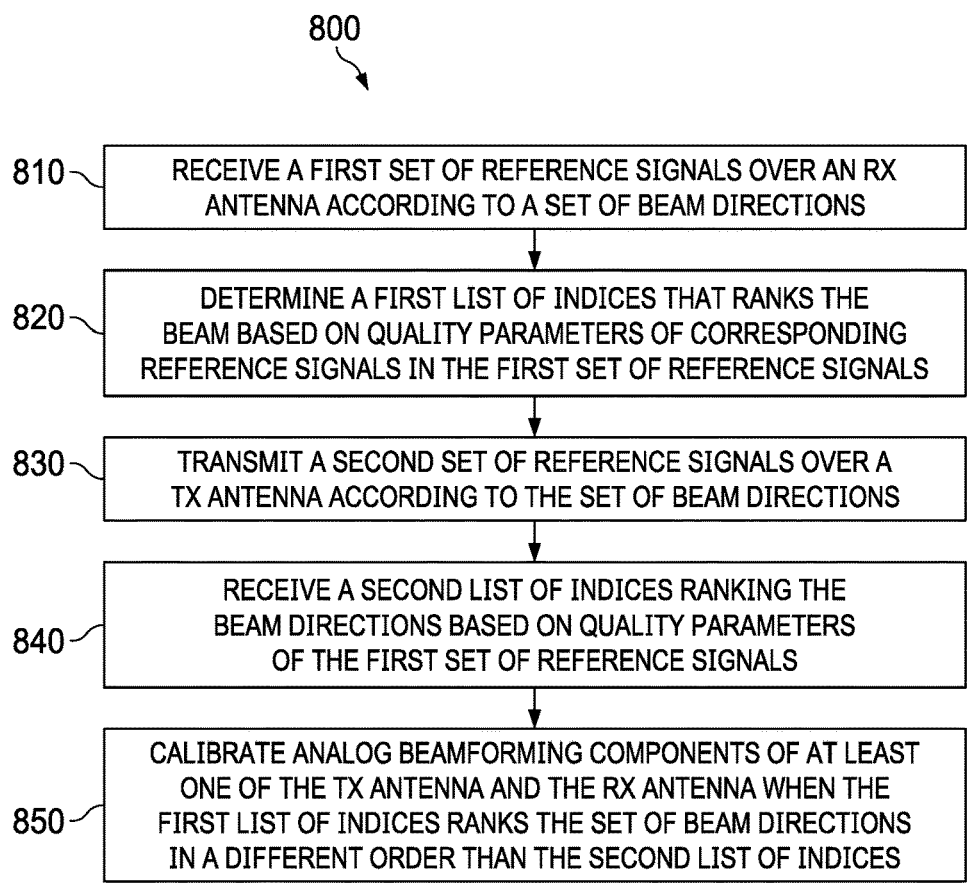
FIG. 8 is a flowchart of an embodiment method for beam calibration.

FIG. 8 is a flowchart of an embodiment method 800 for performing beamforming, as may be performed by a calibrating device. At step 810, the calibrating device receives a first set of reference signals over an RX antenna according to a set of beam directions. At step 820, the calibrating device determines a first list of indices that ranks the beam based on quality parameters of corresponding reference signals in the first set of reference signals. At step 830, the calibrating device transmits a second set of reference signals over a TX antenna according to the set of beam directions. It should be appreciated that steps 810-830 could be performed in any order. At step 840, the calibrating device receives a second list of indices that ranks the beam directions based on quality parameters of corresponding reference signals in the second set of reference signals. At step 850, the calibrating device calibrates analog beamforming components of at least one of the TX antenna and the RX antenna when the first list of indices ranks the set of beam directions in a different order than the second list of indices. In one embodiment, at step 850, the calibrating device determines that the first list of indices ranks the set of beam directions in a different order than the second list of indices and, based thereon, calibrates analog beamforming components of at least one of the TX RF chain and the RX RF chain.

Figure 9:
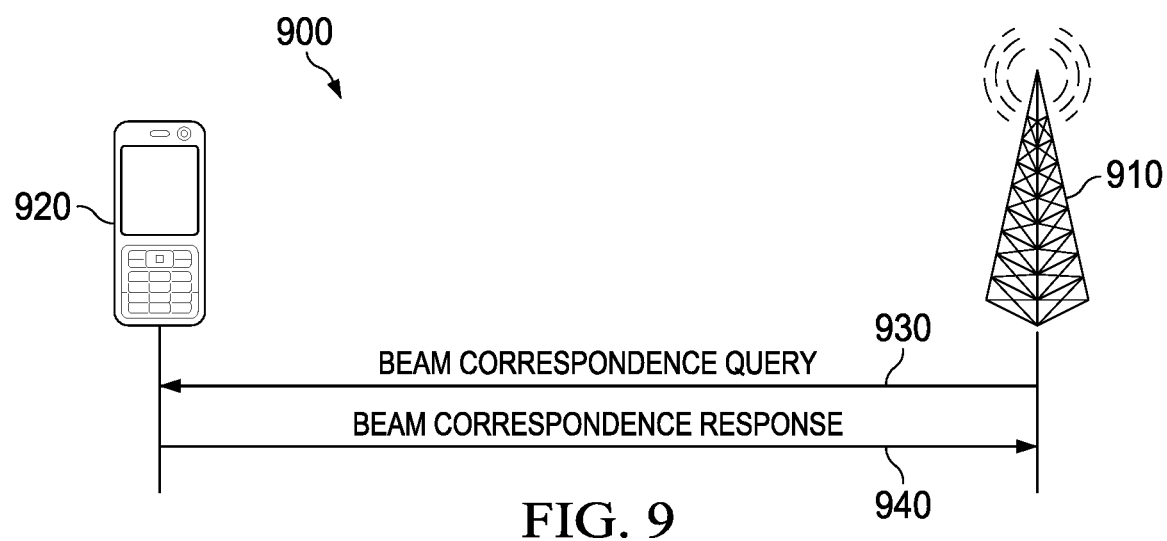
FIG. 9 is a protocol diagram of a communications sequence for reporting a beam correspondence status of a wireless device.

FIG. 9 is a protocol diagram of an embodiment communications sequence 900 for reporting a beam correspondence status. In this example, a base station 910 sends a beam correspondence query 930 to a UE 920 that requests a beam correspondence status of the UE 920. Upon receiving the beam correspondence query 930, the UE 920 sends a beam correspondence response 940 to the base station 910 that includes a beam correspondence status/capability of the UE 920. For instance, the beam correspondence response 940 may acknowledge that a set of transmit (TX) beams of the UE 920 is calibrated with a set of receive (RX) beams of the UE 920. In one embodiment, a set of TX beams of the UE 920 is deemed to be calibrated with a set of RX beams when differences between quality parameters associated with TX beams in the set of TX beams and quality parameters associated with corresponding RX beams in the set of RX beams are less than a threshold. In another embodiment, a set of TX beams of the UE 920 is deemed to be calibrated with a set of RX beams when a list of TX beam indices, that ranks TX beams of the UE 920, has the same order as a list of RX beam indices, that ranks RX beams of the UE 920. The list of TX beam indices may be determined based on quality parameters measured from reference signals transmitted over the TX beams of the UE 920, and the list of RX beam indices may be determined based on reference signals received over the RX beams of the UE 920. The beam correspondence status of the UE 920 may be apriori information of the UE 920, meaning that the UE 920 was aware of its beam correspondence status prior to entering a network coverage area of the base station 910. Alternatively, the beam correspondence status of the UE 920 may be determined by exchanging reference signals with the base station 910 upon entering the network coverage area of the base station 910. Although FIG. 9 depicts a UE receiving, and responding to, a beam correspondence query from a base station, it should be appreciated that other examples are also possible. For example, a base station may receive, and respond to, a beam correspondence query from a UE or relay station. As another example, a relay station may receive, and respond to, a beam correspondence query from a UE or a base station.

Figure 10:
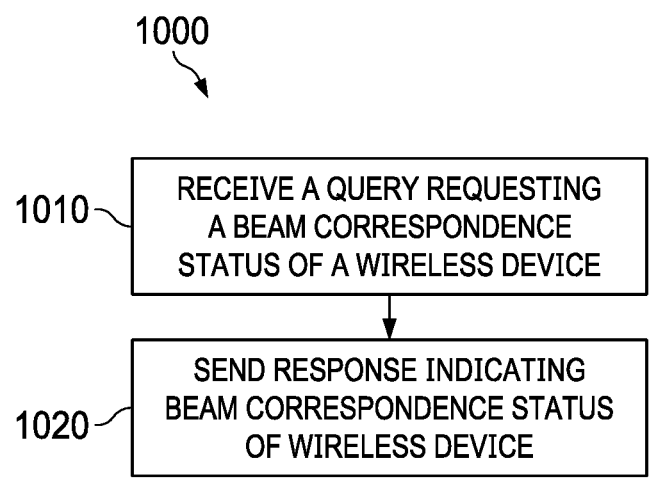
FIG. 10 is a flowchart of an embodiment method for reporting a beam correspondence status of a wireless device.

FIG. 10 is a flowchart of an embodiment method 1000 for responding to a beam correspondence query, as may be performed by a wireless device. At step 1010, the wireless device receives a query requesting a beam correspondence status of a wireless device. At step 1020, the wireless device sends a response including the beam correspondence of the wireless device.

Figure 11:
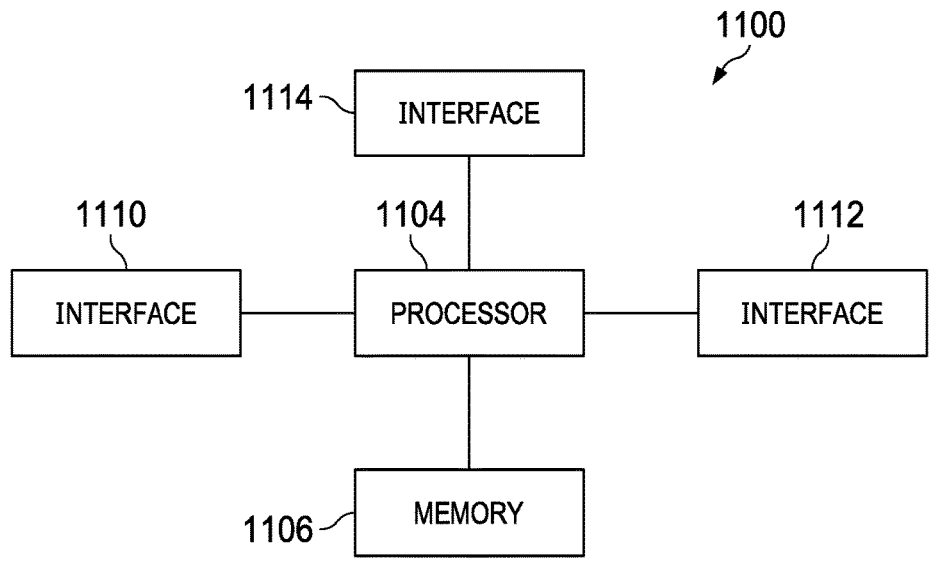
FIG. 11 is a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 1*i*. The processor 1104 may be any component or collection of components adapted to perform computations and/or other processing related tasks, and the memory 1106 may be any component or collection of components adapted to store programming and/or instructions for execution by the processor 1104. A means for configuring a context for a UE may include processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a network TRP, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
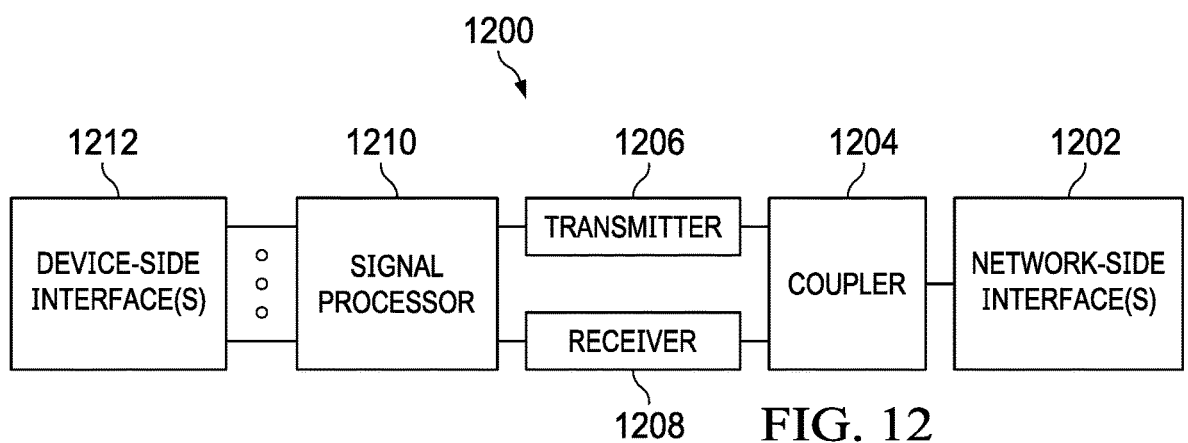
FIG. 12 is a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The network-side interface 1202 may also include any component or collection of components adapted to transmit or receive signaling over a short-range interface. The network-side interface 1202 may also include any component or collection of components adapted to transmit or receive signaling over a Uu interface. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. A means for transmitting an initial message of an access procedure may include transmitter 1206. The receiver 1208 may include any component or collection of components (e.g., down-converter, low noise amplifier, etc.) adapted to convert a carrier signal received over the network-side interface 1202 into a baseband signal. A means for receiving mobile subscriber identifiers, initial downlink messages of access procedures, and forwarded requests to connect to a network may include receiver 1208.

The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure has been described with reference to specific features and embodiments, the description is not intended to be construed in a limiting sense. Various modifications and combinations of the illustrative embodiments will be apparent to persons skilled in the art upon reference to the description. It is therefore intended that the appended claims encompass any such modifications or embodiments.

The invention claimed is:

1. A method, comprising:
receiving, by a first wireless device, a first reference signal (RS) over an receive (RX) radio frequency (RF) chain of the first wireless device;
transmitting, by the first wireless device, a second RS over a transmit (TX) RF chain of the first wireless device using beams determined based on the first RS;
receiving, by the first wireless device from a second wireless device, a second quality parameter corresponding to the second RS;
comparing, by the first wireless device, between the second quality parameter corresponding to the second RS and a first quality parameter corresponding to the first RS to determine a difference between the second quality parameter and the first quality parameter; and
calibrating, by the first wireless device, analog beamforming components of at least one of the TX RF chain or the RX RF chain based on the comparing between the second quality parameter and the first quality parameter.

2. The method of claim 1, wherein the analog beamforming components include analog phase adjustment components positioned on antenna paths between a digital to analog converter of TX RF chain or an analog to digital converter of the RX RF chain and antenna elements on a TX antenna or RX antenna associated with the TX RF chain or RX RF chain.

3. The method of claim 2, wherein the calibrating the analog beamforming components of the at least one of the TX RF chain or the RX RF chain comprises:
adjusting at least one of analog phase shifting levels or delays applied by the analog phase adjustment components.

4. The method of claim 1, wherein the first quality parameter is a reference signal received power (RSRP) level of the first reference signal.

5. The method of claim 1, wherein the first quality parameter is a reference signal received quality (RSRQ) level of the first reference signal.

6. The method of claim 1, wherein the first quality parameter is a reference signal strength indicator (RSSI) level of the first reference signal.

7. The method of claim 1, wherein the first wireless device is a user equipment (UE), a base station, or a relay station.

8. The method of claim 1, the calibrating comprising:
calibrating the analog beamforming components of the at least one of the TX RF chain or the RX RF chain based on the difference exceeding a threshold.

9. A first wireless device comprising:
at least one processor; and
a non-transitory computer readable storage medium storing programming, the programming including instructions that, when executed by the at least one processor, cause the first wireless device to perform operations including:
receiving a first reference signal (RS) over an receive (RX) radio frequency (RF) chain of the first wireless device;
transmitting a second RS over a transmit (TX) RF chain of the first wireless device using beams determined based on the first RS;
receiving, from a second wireless device, a second quality parameter corresponding to the second RS;

comparing between the second quality parameter corresponding to the second RS and a first quality parameter corresponding to the first RS to determine a difference between the second quality parameter and the first quality parameter; and calibrating analog beamforming components of at least one of the TX RF chain or the RX RF chain based on the comparing between the second quality parameter and the first quality parameter.

10. The first wireless device of claim 9, wherein the analog beamforming components include analog phase adjustment components positioned on antenna paths between a digital to analog converter of TX RF chain or an analog to digital converter of the RX RF chain and antenna elements on a TX antenna or RX antenna associated with the TX RF chain or RX RF chain.

11. The first wireless device of claim 10, wherein the calibrating the analog beamforming components of the at least one of the TX RF chain or the RX RF chain comprises:

adjusting at least one of analog phase shifting levels or delays applied by the analog phase adjustment components.

12. The first wireless device of claim 9, wherein the first quality parameter is a reference signal received power (RSRP) level of the first reference signal.

13. The first wireless device of claim 9, wherein the first quality parameter is a reference signal received quality (RSRQ) level of the first reference signal.

14. The first wireless device of claim 9, wherein the first quality parameter is a reference signal strength indicator (RSSI) level of the first reference signal.

15. The first wireless device of claim 9, wherein the first wireless device is a user equipment (UE), a base station, or a relay station.

16. A non-transitory computer-readable medium having instructions stored thereon that, when executed by a first wireless device, cause the first wireless device to perform operations, the operations comprising:

receiving a first reference signal (RS) over an receive (RX) radio frequency (RF) chain of the first wireless device;

transmitting a second RS over a transmit (TX) RF chain of the first wireless device using beams determined based on the first RS;

receiving, from a second wireless device, a second quality parameter corresponding to the second RS;

comparing between the second quality parameter corresponding to the second RS and a first quality parameter corresponding to the first RS to determine a difference between the second quality parameter and the first quality parameter; and calibrating analog beamforming components of at least one of the TX RF chain or the RX RF chain based on the comparing between the second quality parameter and the first quality parameter.

17. The non-transitory computer-readable medium of claim 16, wherein the analog beamforming components include analog phase adjustment components positioned on antenna paths between a digital to analog converter of TX RF chain or an analog to digital converter of the RX RF chain and antenna elements on a TX antenna or RX antenna associated with the TX RF chain or RX RF chain.

18. The non-transitory computer-readable medium of claim 17, wherein the calibrating the analog beamforming components of the at least one of the TX RF chain or the RX RF chain comprises:

adjusting at least one of analog phase shifting levels or delays applied by the analog phase adjustment components.

19. The non-transitory computer-readable medium of claim 16, wherein the first quality parameter is a reference signal received power (RSRP) level of the first reference signal.

20. The non-transitory computer-readable medium of claim 16, wherein the first quality parameter is a reference signal received quality (RSRQ) level of the first reference signal.

21. The non-transitory computer-readable medium of claim 16, wherein the first quality parameter is a reference signal strength indicator (RSSI) level of the first reference signal.

22. The non-transitory computer-readable medium of claim 16, wherein the first wireless device is a user equipment (UE), a base station, or a relay station.

* * * * *